US012674354B2

(12) United States Patent
Jiang

(10) Patent No.: US 12,674,354 B2
(45) Date of Patent: Jul. 7, 2026

(54) DOUBLE-LAYER DAY-NIGHT CURTAIN SYSTEM AND CONTROL METHOD THEREOF

(71) Applicant: NINGBO SUNFREE MOTOR TECHNOLOGY COMPANY LIMITED, Ningbo City (CN)

(72) Inventor: Chun Jiang, Ningbo City (CN)

(73) Assignee: NINGBO SUNFREE MOTOR TECHNOLOGY COMPANY LIMITED, Ningbo City (CN)

( * ) Notice: Subject to any disclaimer, the term of this patent is extended or adjusted under 35 U.S.C. 154(b) by 65 days.

(21) Appl. No.: 18/378,735

(22) Filed: Oct. 11, 2023

(65) Prior Publication Data

US 2024/0138607 A1 May 2, 2024

(30) Foreign Application Priority Data

Nov. 2, 2022 (CN) ......................... 202211360236.7

(51) Int. Cl.
*E06B 9/322* (2006.01)
*E06B 9/24* (2006.01)
*E06B 9/262* (2006.01)

(52) U.S. Cl.
CPC ...... *E06B 9/322* (2013.01); *E06B 2009/2452* (2013.01); *E06B 9/262* (2013.01); *E06B 2009/2627* (2013.01)

(58) Field of Classification Search
CPC ..... E06B 2009/2423; E06B 2009/2447; E06B 2009/2452; E06B 9/262; E06B 9/30; E06B 9/32; E06B 9/322
See application file for complete search history.

(56) References Cited

U.S. PATENT DOCUMENTS 6,318,439 B1 * 11/2001 Matsubara .............. E06B 9/307 160/115
6,550,520 B1 * 4/2003 Rossini ..................... E06B 9/66 160/167 R
7,931,066 B2 * 4/2011 Honda .................... E06B 9/323 160/84.01
8,540,005 B2 * 9/2013 Baugh ..................... E06B 9/322 160/310

(Continued)

*Primary Examiner* — Johnnie A. Shablack
(74) *Attorney, Agent, or Firm* — Juan Carlos A. Marquez; Marquez IP Law Office, PLLC

(57) ABSTRACT

The present invention discloses a double-layer day-night curtain system and a control method thereof; the system comprises an upper rail, a transmission mechanism inside the upper rail, two curtain assemblies connected to the transmission mechanism, a drive mechanism connected to the upper rail to drive the transmission mechanism, and the two curtain assemblies are disposed in parallel; the control method thereof comprises step A1, select the controller according to the curtain assembly: remote controller X for left-right type curtain assembly, and match it with the controller, and proceed to the next step; select remote controller Y for up-down type curtain assembly, and match it with the controller, and skip to step A3; step A2, the controller automatically switches to the control method for controlling the left-right type curtain assembly when matched; step A3, the controller automatically switches to the control method for controlling the up-down type curtain assembly when matched.

12 Claims, 9 Drawing Sheets

(56) References Cited

U.S. PATENT DOCUMENTS

| | | | | |
|---|---|---|---|---|
| 8,573,281 | B2 * | 11/2013 | Drew | E06B 9/262 160/84.05 |
| 8,720,523 | B2 * | 5/2014 | Nakamura | E06B 9/322 160/167 R |
| 8,763,674 | B2 * | 7/2014 | Kataoka | E06B 9/262 160/291 |
| 9,732,555 | B2 * | 8/2017 | Morris | E06B 9/262 |
| 9,765,565 | B2 * | 9/2017 | Morris | E06B 9/262 |
| 10,655,386 | B2 * | 5/2020 | Adams | H04W 52/0277 |
| 10,655,387 | B2 * | 5/2020 | Perache | E06B 9/68 |
| 12,078,011 | B2 * | 9/2024 | Zhang | H02P 5/74 |
| 12,123,257 | B2 * | 10/2024 | Dupielet | E06B 9/322 |
| 2013/0233496 | A1 * | 9/2013 | Ogden, Jr. | E06B 9/322 160/331 |
| 2015/0144275 | A1 * | 5/2015 | Ganzi | E06B 9/32 160/84.03 |
| 2016/0222723 | A1 * | 8/2016 | Morris | E06B 9/322 |
| 2016/0222725 | A1 * | 8/2016 | Morris | E06B 9/262 |
| 2019/0153777 | A1 * | 5/2019 | Byun | E06B 9/42 |
| 2022/0205315 | A1 * | 6/2022 | Hall | E06B 9/322 |
| 2024/0052699 | A1 * | 2/2024 | Qiu | E06B 9/40 |
| 2024/0138607 | A1 * | 5/2024 | Jiang | E06B 9/262 |
| 2025/0003288 | A1 * | 1/2025 | Yang | E06B 9/262 |
| 2025/0020022 | A1 * | 1/2025 | Jiang | E06B 9/322 |

* cited by examiner

DOUBLE-LAYER DAY-NIGHT CURTAIN SYSTEM AND CONTROL METHOD THEREOF

This application is based upon and claims priority to Chinese Patent Application No. 202211360236.7, filed on Nov. 2, 2022.

TECHNICAL FIELD

The present disclosure relates to the field of curtain technologies, and in particular to a double-layer day-night curtain system and a control method thereof.

BACKGROUND

Curtains have the following actual functions: sun-shading, privacy protection with light in and decoration and the like. The ordinary household curtains are mainly opened or closed from left and right and mostly comprise one layer of light-transmission gauze and one layer of blackout fabric, which are used in combination.

A day-night honeycomb curtain is formed of a view-seeing gauze and a blackout fabric which are overlapped up and down so as to protect privacy with light going inside in daytime and help sleep with all light blocked in nighttime. Furthermore, the fabric has unique hexagon structure as well as heat insulation and sound insulation. Since it can be folded up in daytime, no dusts will fall on it, helping keep it clean. Due to the characteristics of the curtain, the light will become soft, warm and comfortable after being filtered by the fabric, thus it's a curtain with excellent functionality and good decorative effect. However, the existing day-night honeycomb curtains usually adopt up-down combination, leading to complex structure, increasing the difficulty of inserting threads and reducing the production efficiency. Further, high technical requirements are imposed on the production assembling and accessories, which results in high after-sales costs. Moreover, it is difficult and complex to control the requirements and thus the entire price is very high, hindering its popularization among the mass consumers. It is urgent to solve the problem of how to lower the quality requirements of the accessories and the difficulty of production.

SUMMARY

The present disclosure provides a technical solution: there is provided a double-layer day-night curtain system with simple structure, convenient production, simple control and low costs.

In the technical solution adopted by the present disclosure, the double-layer day-night curtain system comprises an upper rail, a transmission mechanism disposed inside the upper rail, two curtain assemblies connected to the transmission mechanism, and a drive mechanism connected to the upper rail to drive the transmission mechanism, where the two curtain assemblies are disposed in parallel.

Preferably, two transmission mechanisms are provided and disposed inside the upper rail. Each transmission mechanism comprises a wire reel and a drive shaft, the wire reel is sleeved on the drive shaft, and two curtain assemblies are respectively disposed under the two transmission mechanisms.

Preferably, the drive mechanism comprises a first motor, a first speed reducer, a second speed reducer, a second motor and a controller. The first motor and the second motor are both electrically connected to the controller. The first motor is connected to one transmission mechanism through the first speed reducer and the second motor is connected to the other transmission mechanism through the second speed reducer.

Preferably, a mounting cavity is disposed inside the upper rail, and a baffle plate is disposed at a side of the mounting cavity. The drive mechanism is disposed at the other side of the mounting cavity. The two transmission mechanisms are both disposed inside the mounting cavity, and the transmission mechanisms further comprise support seats for supporting the wire reels.

Preferably, a partition plate is disposed in the middle of the mounting cavity to partition the mounting cavity equally into two mounting cavities, and the two transmission mechanisms are respectively disposed in the two mounting cavities.

Preferably, the drive mechanism further comprises a mounting housing. The first motor, the first speed reducer, the second speed reducer, the second motor and the controller are all disposed inside the mounting housing. After mounting is completed, the drive mechanism is shaped like U. The partial mounting housings for accommodating the first motor and the second motor respectively protrude into the two mounting cavities.

Preferably, a Hall signal plate is disposed at an end of the first motor and the second motor respectively, and the Hall signal plate is disposed in parallel to a main control board in the controller.

Preferably, each transmission mechanism comprises two wire reels and one drive shaft, and the two wire reels are both sleeved on the one drive shaft. Further, an output shaft at a side of the first motor is connected to the drive shaft of one transmission mechanism through the first speed reducer, and an output shaft at a side of the second motor is connected to the drive shaft of the other transmission mechanism through the second speed reducer.

Preferably, each transmission mechanism comprises two wire reels and two drive shafts, the two wire reels are sleeved on the two drive shafts respectively. Further, two first speed reducers and two second speed reducers are provided. The output shaft at one side of the first motor is connected to one drive shaft of one transmission mechanism through one first speed reducer, and the output shaft at the other side of the first motor is connected to another drive shaft of one transmission mechanism through the other first speed reducer. The output shaft at one side of the second motor is connected to one drive shaft of the other transmission mechanism through one second speed reducer, and the output shaft at the other side of the second motor is connected to the other drive shaft of the other transmission mechanism through the other second speed reducer.

Preferably, the curtain assembly comprises a curtain body, a pull rope and a lower beam. The lower beam is disposed under the transmission mechanism and connected to the wire reel through the pull rope. The curtain body is disposed between the upper rail and the lower beam and the pull rope penetrates through the curtain body.

Preferably, a remote controller X1, a remote controller X2, a first button module, a second button module and a communication module are further provided. The first button module, the second button module and the communication module are all electrically connected to the controller. Further the Remote controller X1 and the Remote controller X2 are in communication connection with the controller through the communication module. The first button module is pressed to match the Remote controller X1 with the controller and further, the Remote controller X1 can control one drive mechanism, and the second button module is pressed to match the Remote controller X2 with the controller, and further the Remote controller X2 can control the other drive mechanism.

Preferably, two mounting grooves for mounting two curtain assemblies are disposed at a lower end surface of the upper rail, and the curtain assemblies are detachably mounted into the mounting grooves.

Preferably, the curtain assemblies are mounted into the mounting grooves by insertion. After the curtain assemblies are mounted into the mounting grooves, one end of the curtain assemblies is abutted against the baffle plate and the other end of the curtain assemblies is abutted against the mounting housing.

There is provided a control method of a double-layer day-night curtain system, which comprises two remote controllers, i.e. a remote controller X and a remote controller Y. The remote controller X is used to control the left-right type curtain assembly and the remote controller Y is used to control the up-down type curtain assembly. The control method comprises the following steps.

At step A1, according to the needs, the curtain assembly is mounted, and then a corresponding remote controller is selected according to the mounted curtain assembly. If the mounted curtain assembly is the left-right type curtain assembly, the remote controller X is selected and then matched with the controller, and then, proceed to the next step; if the mounted curtain assembly is the up-down type curtain assembly, the remote controller Y is selected and then matched with the controller Y, and then skip to A3.

At step A2, if the remote controller X is successfully matched with the controller, the controller automatically switches to the control method for controlling the left-right type curtain assembly.

At step A3, if the remote controller Y is successfully matched with the controller, the controller automatically switches to the control method for controlling the up-down type curtain assembly.

Preferably, there are two groups of buttons disposed on the remote controller X, which are a first group of buttons and a second group of buttons. Each group of buttons respectively comprises an up button, a stop button and a down button. The control method of controlling the left-right type curtain assembly in the A2 may comprise the following steps.

At step B1, the up button in the first group of buttons is pressed, where one drive mechanism drives the corresponding curtain assembly to run upward; the down button in the first group of buttons is pressed, and one drive mechanism drives the corresponding curtain assembly to run downward; the stop button in the first group of buttons is pressed, and one drive mechanism is stopped and thus the corresponding curtain assembly is stopped.

At step B2, the up button in the second group of buttons is pressed, where the other drive mechanism drives the corresponding curtain assembly to run upward; the down button in the second group of buttons is pressed, where the other drive mechanism drives the corresponding curtain assembly to run downward; the stop button in the second group of buttons is pressed, where the other drive mechanism is stopped and thus the corresponding curtain assembly is stopped.

Preferably, there are two groups of buttons disposed on the remote controller Y, which are a first group of buttons and a second group of buttons. Each group of buttons respectively comprise an up button, a stop button and a down button, and the two drive mechanisms are a first drive mechanism and a second drive mechanism respectively. The up-down type curtain assembly comprises sequentially from top to bottom: an upper rail, a first curtain body, a first lower beam, a second curtain body, and a second lower beam. The first drive mechanism controls the first lower beam, and the first group of buttons controls the first lower beam. The second drive mechanism controls the second lower beam and the second group of buttons controls the second lower beam. The control method of controlling the up-down type curtain assembly in A3 comprises the following steps.

At step C1, if the up button or the down button in the first group of buttons or the second group of buttons is pressed separately, the first lower beam runs upward or downward, or the second lower beam runs upward or downward, and at this time, the first lower beam and the second lower beam run separately.

At step C2, if the stop button in one group is pressed, the corresponding drive mechanism is stopped and the corresponding first lower beam or second lower beam is stopped.

Preferably, in the running mode, the controller can obtain, in real time, travel data of the first motor in the first drive mechanism and the second motor in the second drive mechanism, and then calculate a real-time position of the first lower beam and the second lower beam, and compare the real-time position with a preset upper limit position of the first lower beam, a preset lower limit position of the second lower beam, and a preset safe distance between the first lower beam and the second lower beam, and stop the corresponding drive mechanism upon reaching.

Compared with the existing technologies, the present disclosure, after adopting the above structure and method, may have the following advantages: two curtain assemblies are disposed in parallel, which is equivalent to change the up-down combination relationship to a left-right combination relationship. Thus, the day-night curtain has the same effect but the structure is simplified to an ordinary curtain X2, which greatly reduces the production difficulty. Therefore, the production and assembling are simpler, promoting its popularization. Furthermore, since they are two independent curtain systems, various combinations of curtain types may be evolved for use. Therefore, they are not limited to the combination of the honeycomb curtains, and hence, the consumers will have more options to satisfy their personal requirements. Along with popularization of intelligent lives, the intelligent electric curtains will become a mainstream. We creatively integrate two motor systems into one control system with only one controller. In this way, the elements and devices on the controller can be shared while the two curtains can be controlled separately. Thus, the control logic relationship will become very simple and reduce the procedural difficulty and after-sales problems. Further, docking with various control platforms will be simpler.

The curtain assemblies can be detachably connected into the mounting grooves at the lower end surface of the upper rail. In this way, the curtain assembly can be selected based on needs, for example, the left-right type curtain assembly in the present disclosure or the up-down type curtain assembly in the prior arts may be selected. Then, based on the mounted curtain assembly, a matching remote controller is selected. The controller may, based on the matching remote controller, automatically select a proper control mode for control. This is equivalent to mounting the left-right type curtain body or the up-down type curtain body based on the needs of the users, satisfying more requirements of the customers.

Figure 1:
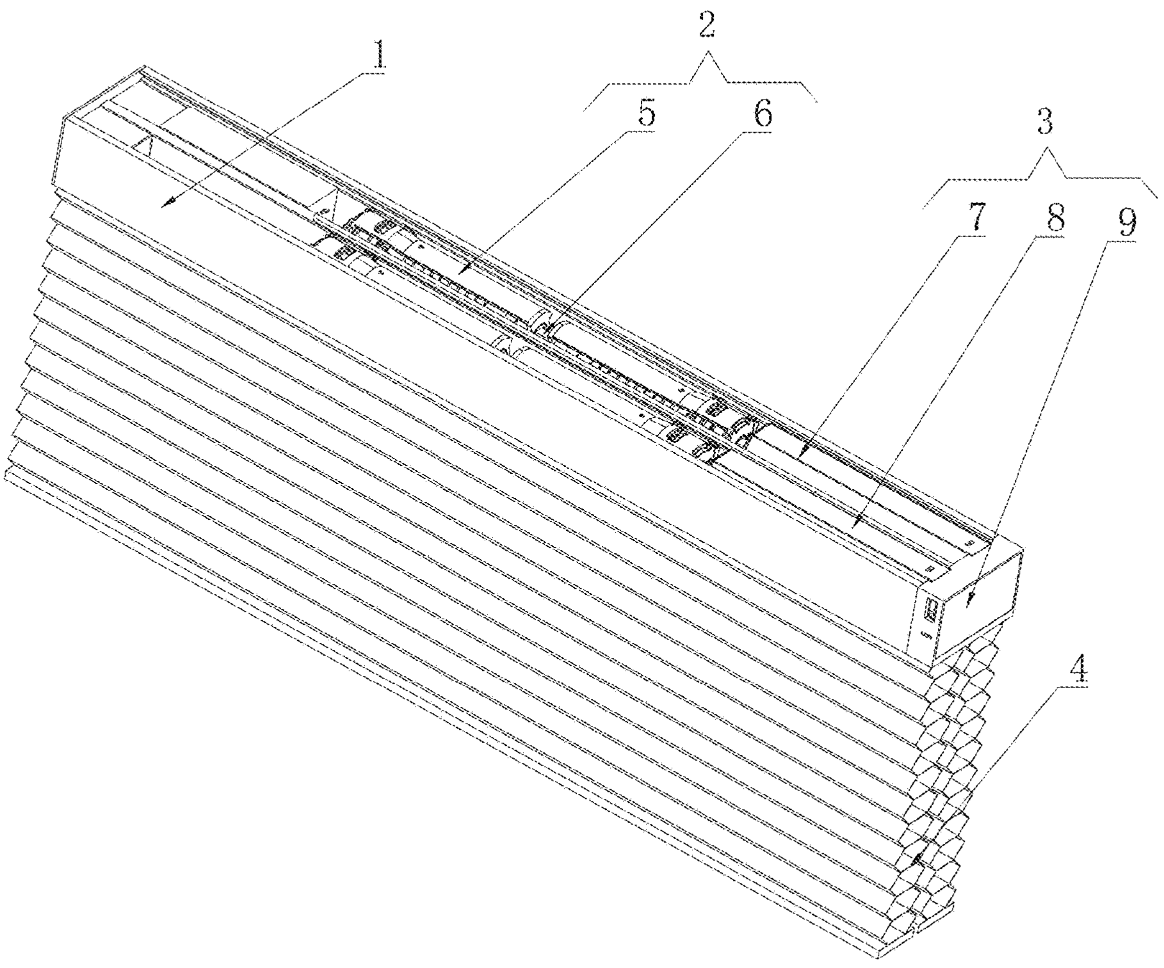
FIG. 1 is a structural schematic diagram of a double-layer day-night curtain system according to an embodiment 1 of the present disclosure.
Figure 2:
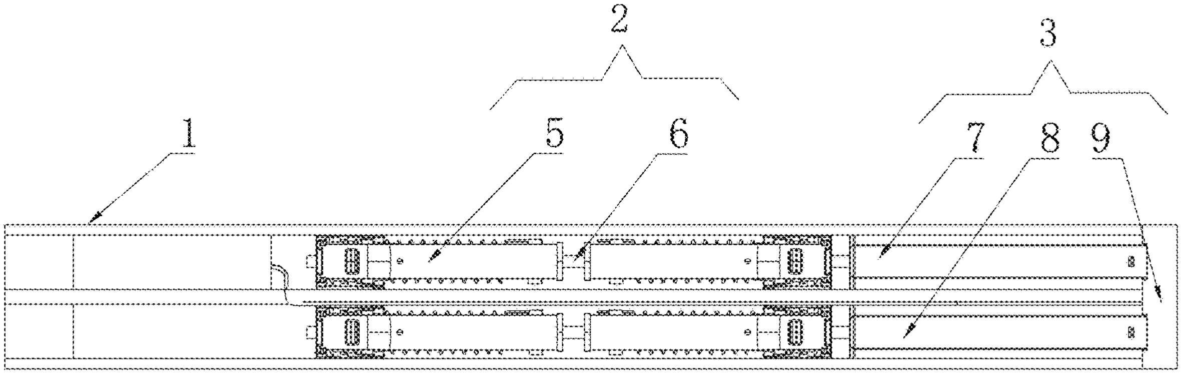
FIG. 2 is a top view of a double-layer day-night curtain system according to an embodiment 1 of the present disclosure.
Figure 3:
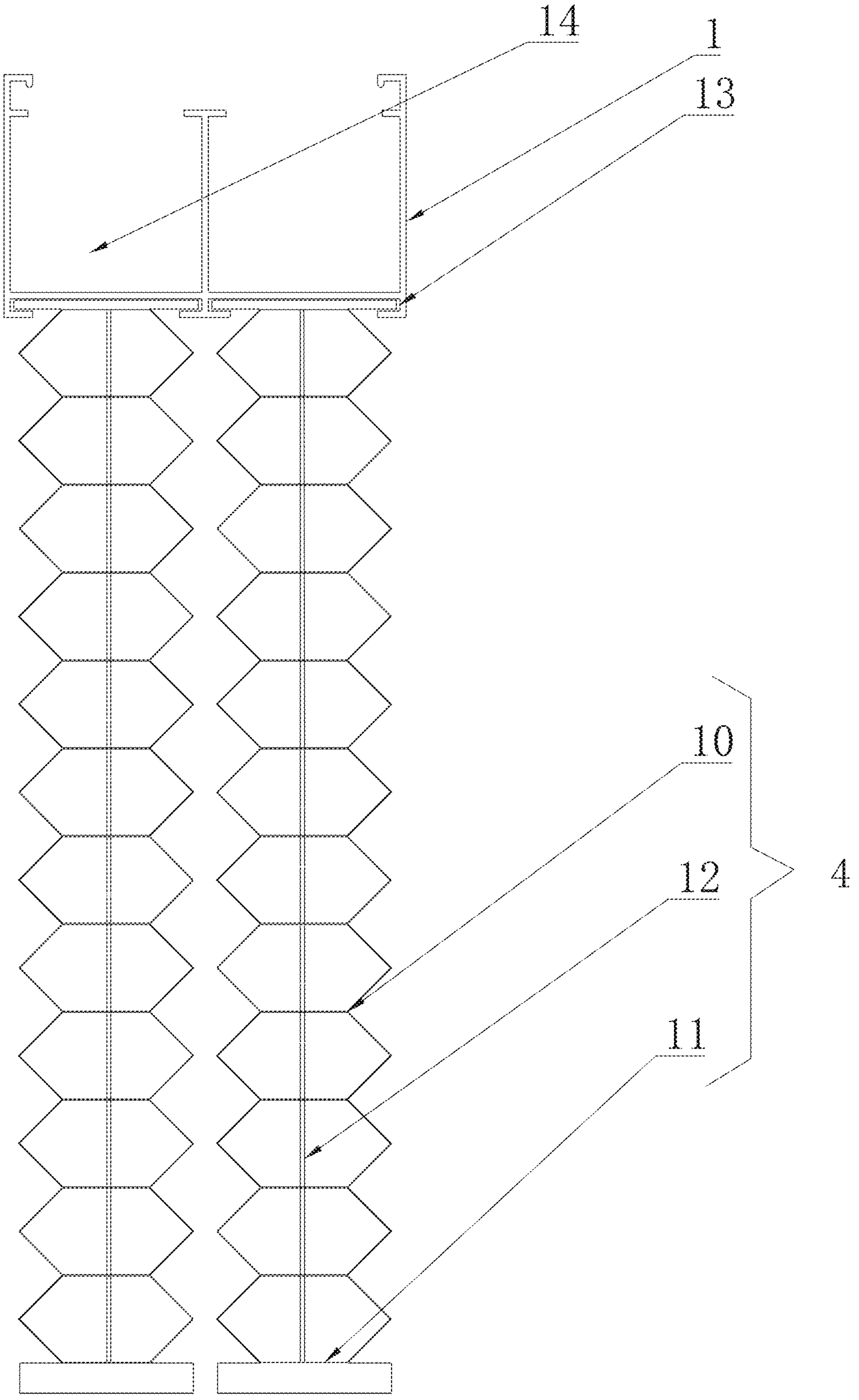
FIG. 3 is a side view of a double-layer day-night curtain system according to an embodiment 1 of the present disclosure.
Figure 4:
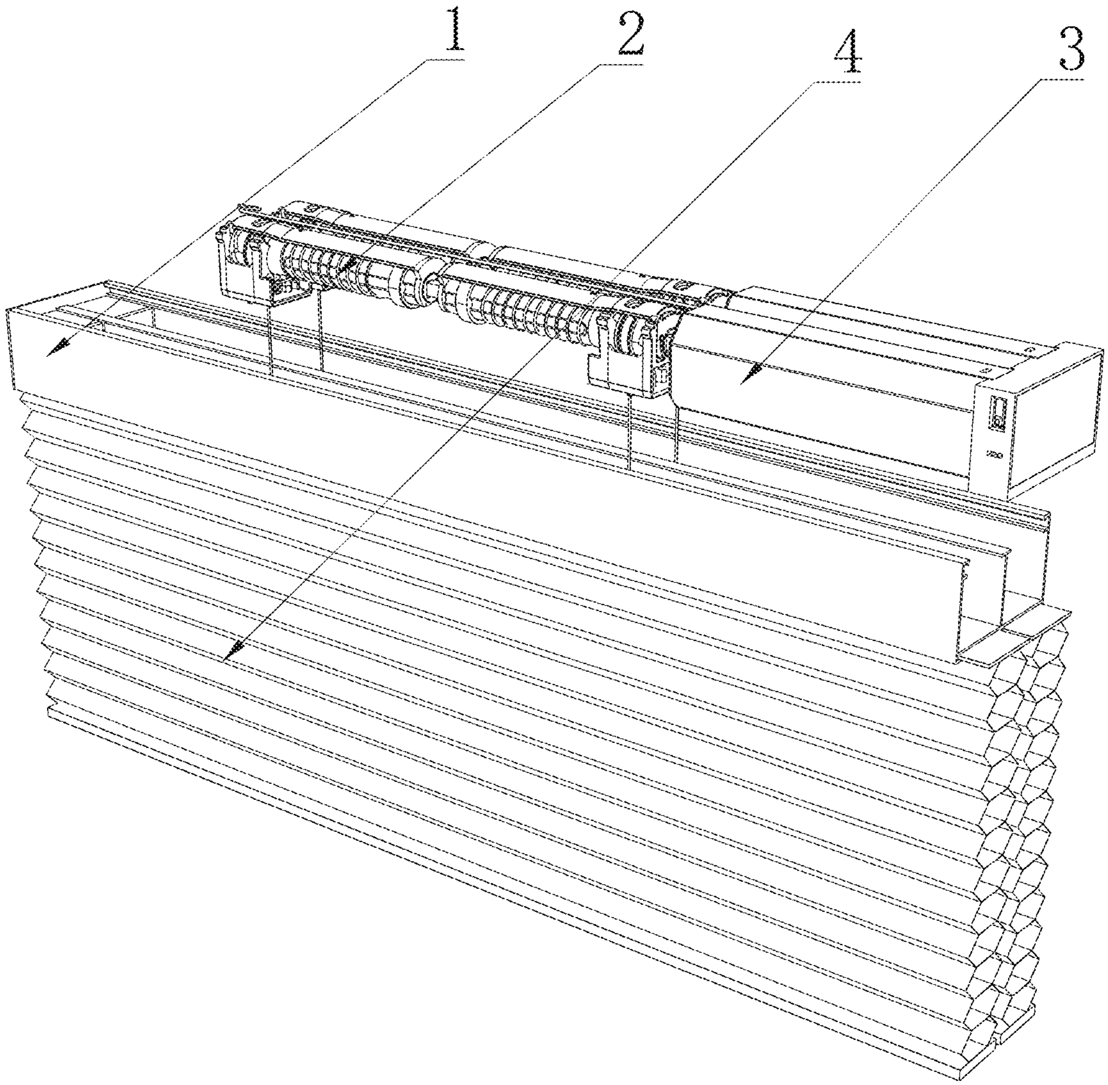
FIG. 4 is an exploded view of a double-layer day-night curtain system according to an embodiment 1 of the present disclosure.
Figure 5:
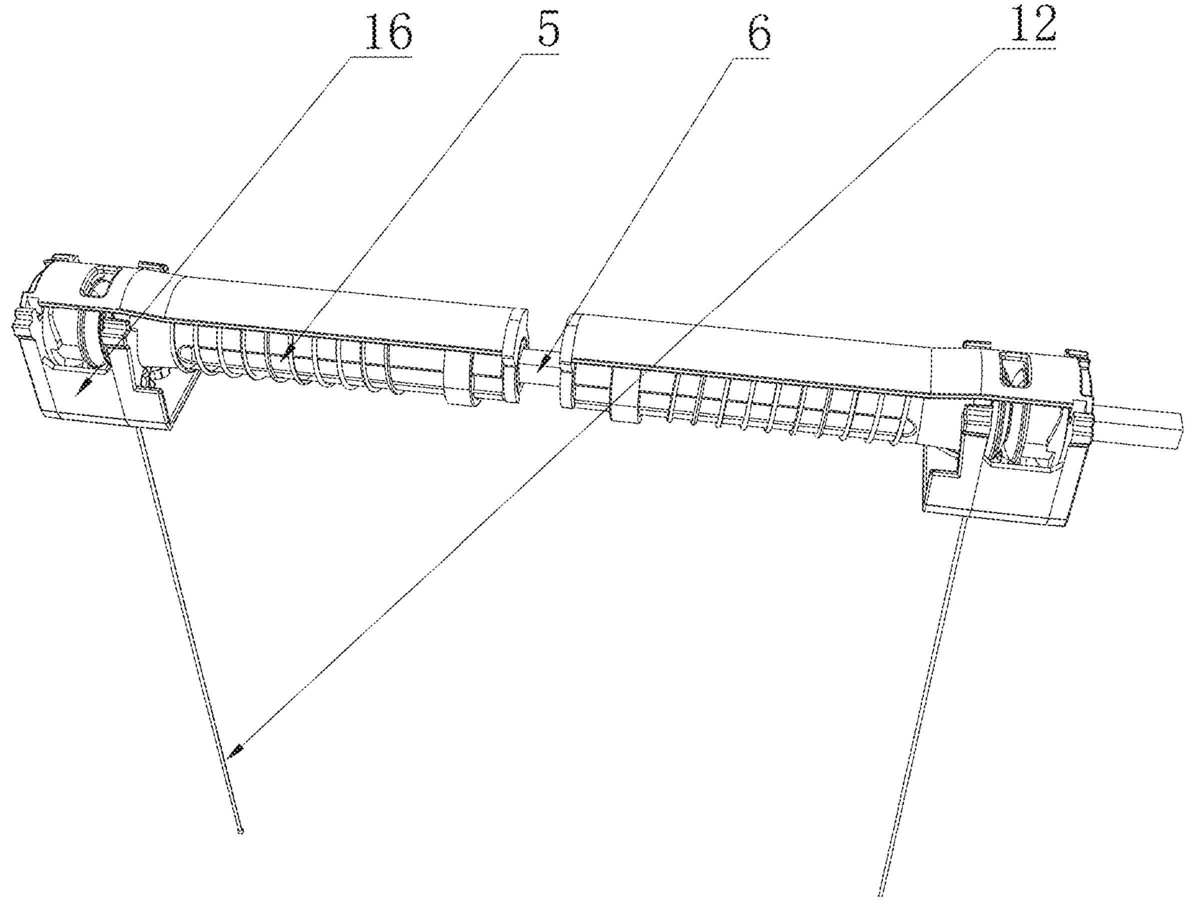
FIG. 5 is a structural schematic diagram of a transmission mechanism in a double-layer day-night curtain system according to an embodiment 1 of the present disclosure.
Figure 6:
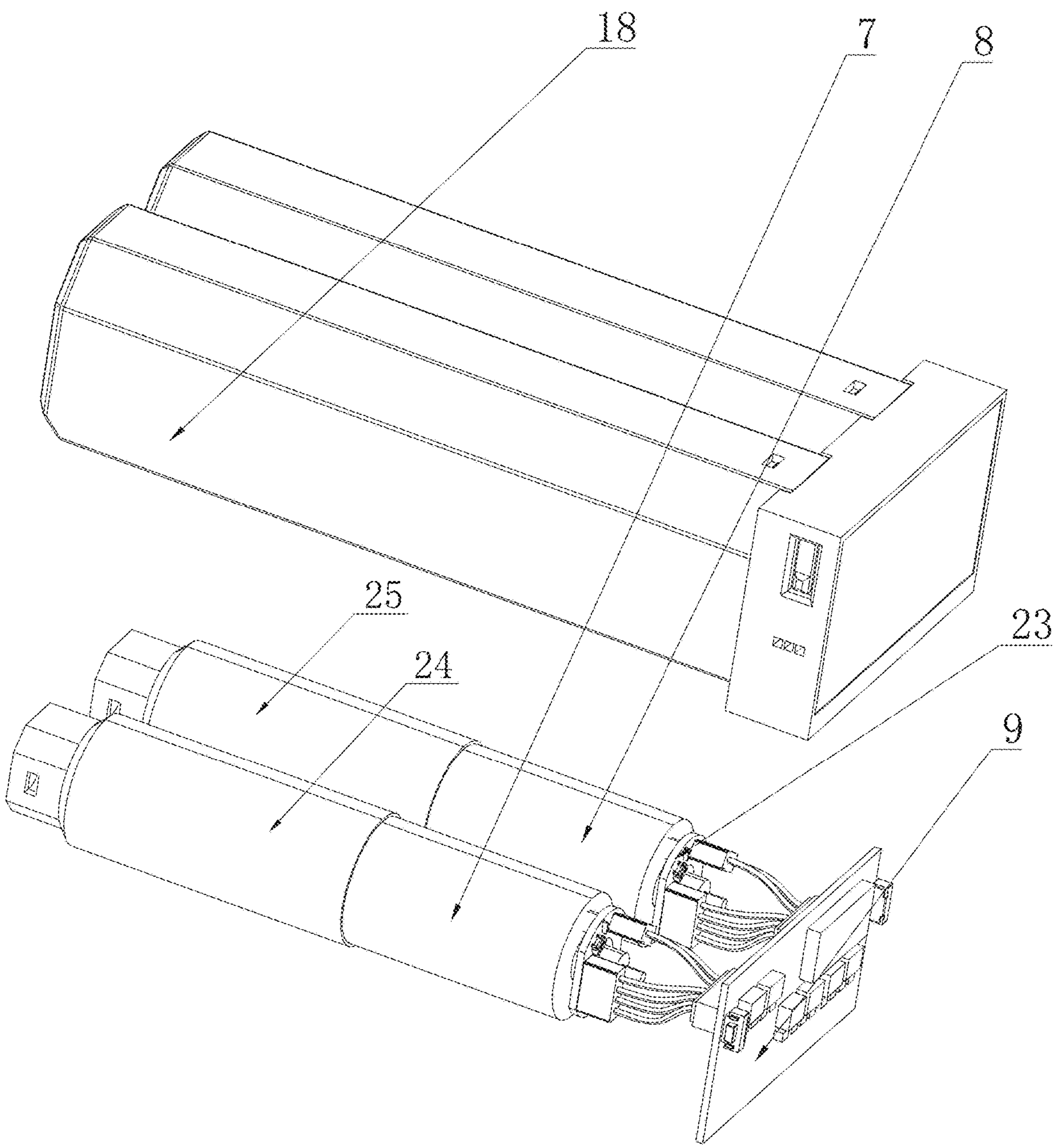
FIG. 6 is an exploded view of a drive mechanism in a double-layer day-night curtain system according to an embodiment 1 of the present disclosure.
Figure 7:
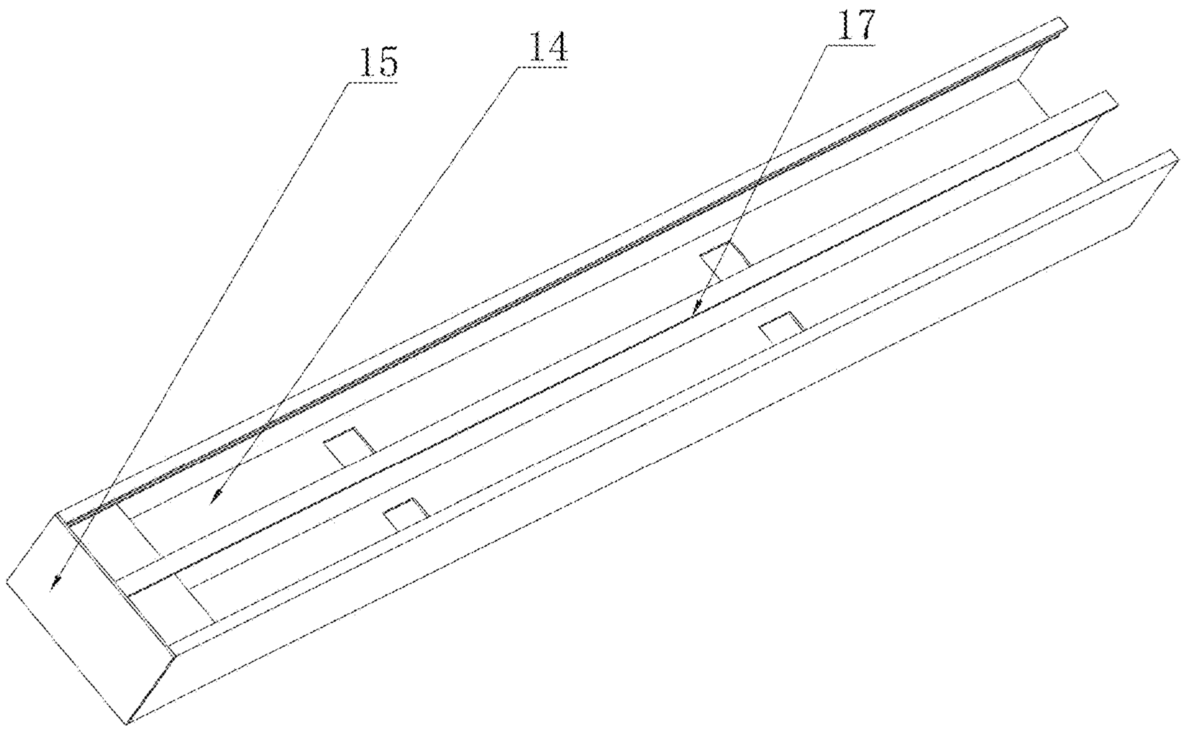
FIG. 7 is a structural schematic diagram of an upper rail in a double-layer day-night curtain system according to an embodiment 1 of the present disclosure.
Figure 8:
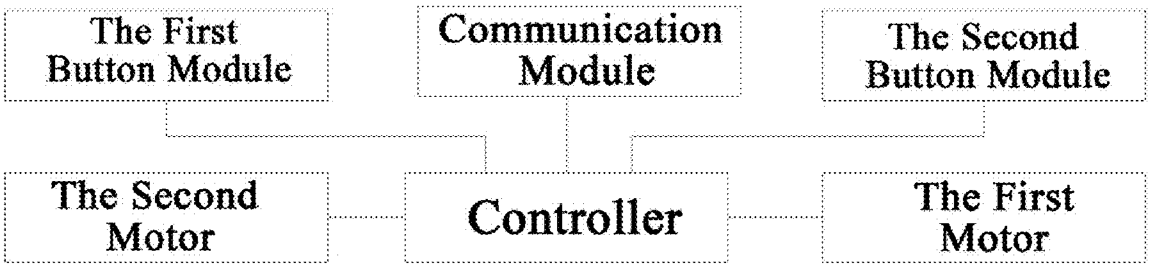
FIG. 8 is a connection block diagram of a circuit of a double-layer day-night curtain system according to an embodiment 1 of the present disclosure.

Numerals of drawings are described below: 1. upper rail, 2. transmission mechanism, 3. drive mechanism, 4. curtain assembly, 5. wire reel, 6. drive shaft, 7. first motor, 8. second motor, 9. controller, 10. curtain body, 11. lower beam, 12. pull rope, 13. mounting groove, 14. mounting cavity, 15. baffle plate, 16. support seat, 17. partition plate, 18. mounting housing 19. first curtain body, 20. first lower beam, 21. second curtain body, 22. second lower beam, and 23. Hall signal plate.

DETAILED DESCRIPTIONS OF EMBODIMENTS

The embodiments of the present disclosure will be elaborated below with examples of the embodiments shown in the drawings. Same or similar numerals throughout the specification represent same or similar elements or elements having the same or similar functions. The embodiments described by referring to the accompanying drawings are only illustrative and are intended to interpret the present disclosure and shall not be understood as limiting of the present disclosure.

Embodiment 1

There is provided a double-layer day-night curtain system. As shown in FIGS. 1 to 8, the system comprises an upper rail, a transmission mechanism 2, a drive mechanism 3, a curtain assembly 4, a remote controller X1, and a remote controller X2.

The upper rail 1 is internally provided with a mounting cavity 14 disposed along a width direction, and a partition plate is disposed in the middle of the mounting cavity to partition the mounting cavity 14 into two mounting cavities 14, which are a first mounting cavity and a second mounting cavity. A baffle plate 15 is used to block one side of the two mounting cavities 14, and the drive mechanism 3 is mounted at the other side of the mounting cavities 14. Two mounting grooves 13, i.e. a first mounting groove and a second mounting groove, are disposed on a lower end surface of the upper rail 1, where the first mounting groove is mounted away from a window.

Two transmission mechanisms 2 are provided and disposed in parallel inside the upper rail 1. Each transmission mechanism comprises a first wire reel, a second wire reel and a drive shaft 6. The first wire reel and the second wire reel are both sleeved on the drive shaft 6 and rotated under the drive of the drive shaft 6. Support seats for mounting the wire reels are disposed inside the mounting cavities 14 of the upper rail 1, and each wire reel 5 corresponds to one support seat 16. A pull rope 12 is wound on each wire reel 5. One transmission mechanism 2 is mounted in the first mounting cavity and the other transmission mechanism 2 is mounted in the second mounting cavity.

The drive mechanism 3 comprises a first motor 7, a first speed reducer, a second speed reducer, a second motor 8, a controller 9 and a mounting housing 18. The first motor 7, the first speed reducer, the second speed reducer, the second motor 8, and the controller 9 are all mounted inside the mounting housing 18. The mounting housing 18 where the controller 9 is located is used as bottom, and the mounting housing 18 where the two motors are located is used as two parts protruding from both sides of the bottom. A Hall signal plate is mounted at an end of the first motor 7 and the second motor 8 respectively, and disposed in parallel to a main control board inside the controller 9. In this case, the completed mounting housing 18 is shaped like U. The first motor 7 and the second motor 8 are both electrically connected to the controller 9, such that the operation of the first motor 7 and the second motor 8 can be controlled by using the controller 9. The first motor 7 and the second motor 8 both output from one side, that is, an output shaft is disposed at one side of the first motor 7 and the second motor 8 respectively. The output shaft of the first motor 7 is connected to the drive shaft 6 of the first transmission mechanism 2 through the first speed reducer, and thus, the first transmission mechanism 2 can be driven to work under the drive of the first motor 7. Further, the partial mounting housing where the first motor 7 is located protrudes into the mounting cavity where the first transmission mechanism 2 is located. The output shaft of the second motor 8 is connected to the drive shaft 6 of the second transmission mechanism 2 through the second speed reducer, and thus, the second transmission mechanism 2 can be driven to work under the drive of the second motor 7. Further, the partial mounting housing 18 where the second motor 7 is located protrudes into the mounting cavity where the second transmission mechanism 2 is located. The partial mounting housing 18 where the controller 9 is located is disposed outside the mounting cavities 14 of the upper rail 1 and is provided with an end cover. In a case of maintenance, the end cover may be opened to take out the controller 9 from the mounting housing 18.

Furthermore, the controller 9 is further provided with a first button module, a second button module and a communication module, which are all electrically connected to the controller 9. In addition, the first button module and the second button module both are disposed at both sides of the mounting housing 18, and the communication module is used to perform wireless communication with the Remote controller X1 and the Remote controller X2. The first button module is pressed to match the Remote controller X1 with the controller 9 and further, the Remote controller X1 can control one drive mechanism 3, and the second button module is pressed to match the Remote controller X2 with the controller 9, and further the Remote controller X2 can control the other drive mechanism 3.

Two curtain assemblies 4 are disposed in parallel and aligned to each other. Each curtain assembly comprises a curtain body 10, a pull rope 12 and a lower beam 11. The curtain bodies 10 of the two curtain assemblies 4 both adopt a honeycomb curtain. The lower beam 11 of each curtain assembly 4 is disposed exactly under the drive shaft 6 of the corresponding the transmission mechanism 2. One end of the pull rope 12 of each curtain assembly 4 is connected to a wire reel 5 in the corresponding transmission mechanism 2 and the other end of the pull rope 12 is passed through the curtain body 10 to connect with the lower beam 11. Since each transmission mechanism 2 is provided with two wire reels 5, there may be two pull ropes 12. The two pull ropes 12 may be respectively connected to the two wire reels 5. The lower ends of the curtain bodies 10 are fixed onto the corresponding lower beams 11. The upper ends of the curtain bodies 10 are connected in two mounting grooves 13 on the lower end surface of the upper rail 1. Thus, the curtain bodies 10 can be controlled to unfold and fold by pulling the pull ropes 12.

The control principle of the present embodiment is as follows: the remote controller X1 is used to control the first motor 7 and further control one transmission mechanism 2 and curtain assembly 4, and the remote controller X2 is used to control the second motor 8 and further control the other transmission mechanism 2 and curtain assembly 4. During matching, a user needs to press the first button module to match the remote controller X1 with the controller 9. After the matching, the operation of the first motor 7 can be controlled by using the remote controller X1. Further, the user may press the second button module to match the remote controller X2 with the controller 9. After matching, the operation of the second motor 8 can be controlled by using the remote controller X2. In other words, two motors are controlled by two remote controllers without any mutual association between the two controls. Thus, the control logic is simpler. That is, pressing the up button corresponds to ascending of the lower beam and pressing the down button corresponds to descending of the lower beam, and pressing the stop button corresponds to stopping of the lower beam. Furthermore, the matching of the controller 9 and the remote controllers belongs to the existing conventional technology and will not be repeated herein.

Embodiment 2

Figure 9:
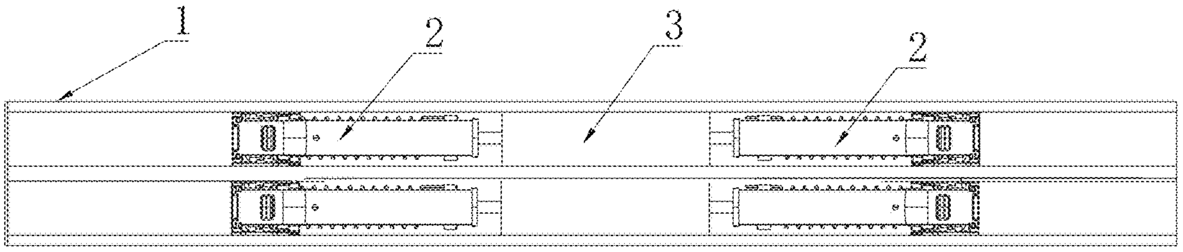
FIG. 9 is a simple diagram of a double-layer day-night curtain system according to an embodiment 2 of the present disclosure.

As shown in FIG. 9, the present embodiment differs from the embodiment 1 as follows: in the embodiment 2, each transmission mechanism 2 comprises two wire reels 5 and two drive shafts 6, where each wire reel 5 is sleeved on one drive shaft such that the wire reel 5 sleeved on the drive shaft can rotate along with the drive shaft 6; the drive mechanism 3 comprises two motors, four speed reducers, a controller and a mounting housing, where the two motors, the four speed reducers and one controller are all disposed inside the mounting housing to form one integral drive mechanism which is placed in the middle of the upper rail 1. One motor and two speed reducers form one transmission mechanism 2, and the motors perform output from both sides respectively. Thus, a speed reducer may be disposed at both sides of one motor respectively, and then the speed reducers at both sides are connected to two drive shafts 6 so as to drive the drive shafts 6 to rotate, and thus drive the wire reels 5 to run. To sum up, it can be simply understood as follows: in the embodiment 1, the motors perform output from a single side and thus the drive mechanism 3 is disposed at a side of the upper rail 1; whereas in the embodiment 2, the motors perform output from two sides, and thus, the drive mechanism 3 is disposed in the middle of the upper rail 1.

Embodiment 3

Figure 10:
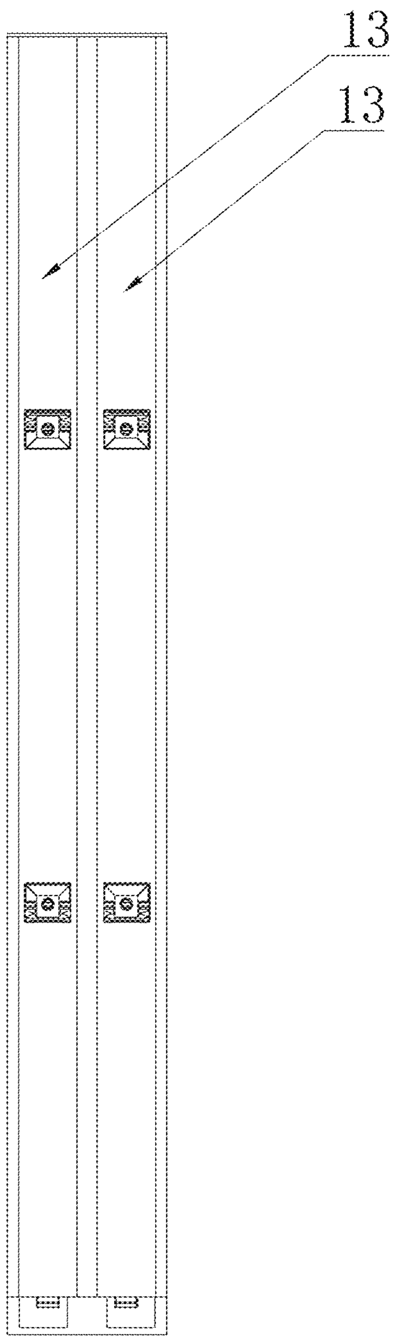
FIG. 10 is a bottom view of a double-layer day-night curtain system without a curtain assembly according to an embodiment 3 of the present disclosure.
Figure 11:
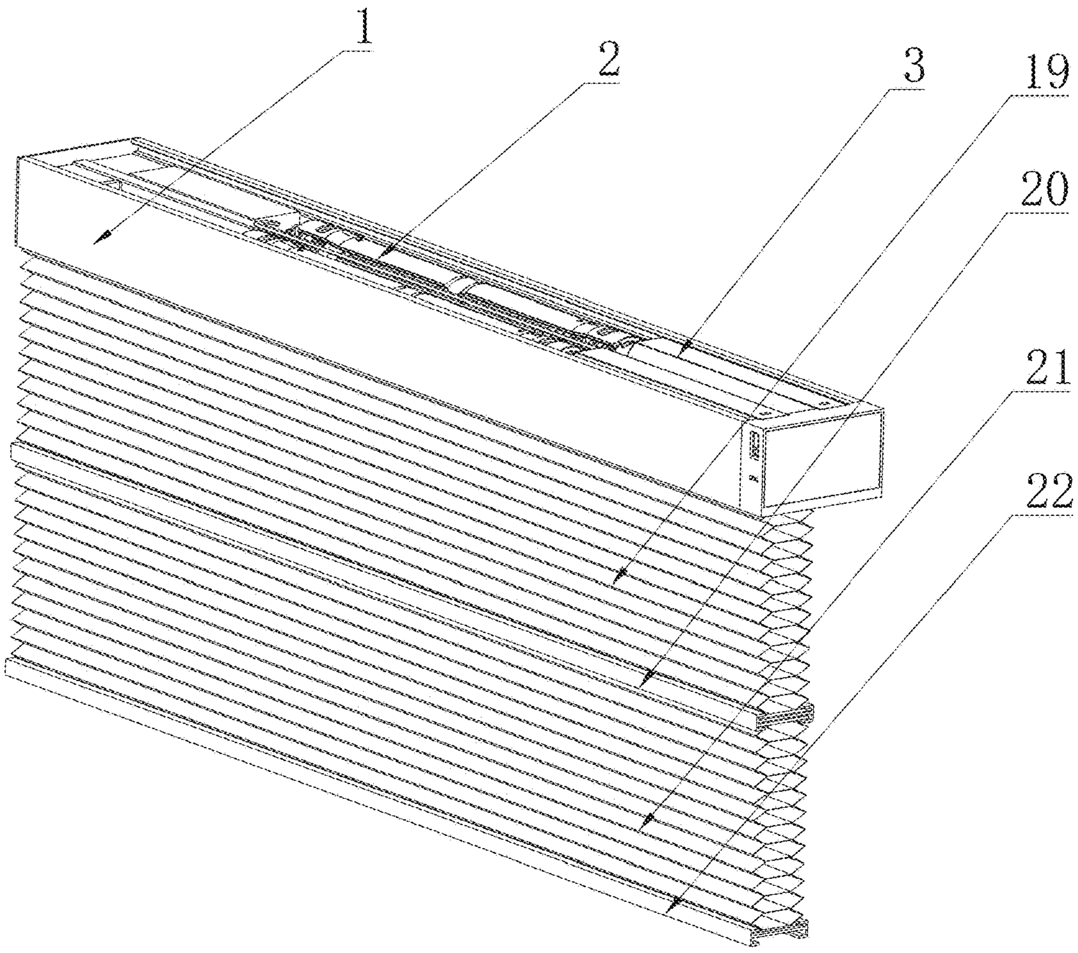
FIG. 11 is a structural schematic diagram of an up-down type curtain assembly in a double-layer day-night curtain system according to an embodiment 3 of the present disclosure.

As shown in FIG. 10, the present embodiment differs from the embodiment 1 as follows: in the embodiment 3, the upper ends of the curtain bodies 10 are connected, by insertion, with the mounting grooves on the lower end surface of the upper rail 1; after the upper ends of the curtain bodies 10 are inserted into the mounting grooves 13, one end of the curtain bodies 10 is abutted against the baffle plate 15 and the other end is abutted against the mounting housing 18. When the user mounts the housing, the curtain assemblies may be firstly inserted into the mounting grooves 13, and then the drive mechanism is mounted. During disassembling, the drive mechanism may be firstly dismounted, and then the curtain assemblies 4 can be dismounted easily from the mounting grooves 13. In this way, the curtain assemblies 4 can be changed conveniently. In the background part of the present disclosure, there is provided an up-down type curtain assembly 4. As shown in FIG. 11, the curtain assembly comprises, from top to bottom, an upper rail 1, a first curtain body 19, a first lower beam 20, a second curtain body 21 and a second lower beam 22. It belongs to a conventional day-night curtain in the prior arts and will not be detailed herein. There is another curtain assembly 4 which is the left-right type curtain assembly 4 mentioned in the embodiment 1 of the present disclosure. In this embodiment, the two curtain assemblies 4 can be interchanged, which is a physical structural change. If there is a need to mount the up-down type curtain assembly 4, the first curtain body 19 of the curtain assembly 4 is mounted to the first mounting groove; if there is a need to mount the left-right type curtain assembly 4, the curtain bodies 10 of the curtain assembly 4 are respectively mounted to the first mounting groove and the second mounting groove. Each type of curtain assemblies 4 matches one type of remote controllers. The left-right type curtain assembly 4 corresponds to the remote controller X, and the up-down type curtain assembly 4 corresponds to the remote controller Y. When the left-right type curtain assembly 4 is mounted, it can be mounted as shown in FIG. 1. The remote controller X is matched with the controller 9. After successful matching, the controller 9 can automatically switch to the control method applicable to the left-right type curtain assembly 4, namely, the two curtain assemblies 4 can be controlled separately with mutual interference, which is similar to the control on two separate honeycomb curtains. When the up-down type curtain assembly 4 is mounted with the mounting position located in the first mounting groove, it can be mounted as shown in FIG. 11. The remote controller Y is matched with the controller 9. After successfully matching, the controller 9 can automatically switch to the control method applicable to the up-down type curtain assembly 4, namely, two curtain assemblies 4 are associated with each other, and thus mutual feedback shall be performed and the joint control is required. Operation buttons are disposed on the front sides of the remote controller X and the remote controller Y respectively, and the operation buttons comprise a first up button, a first down button, a first top button, a second up button, a second down button and a second stop button. On the back side of the remote controller X and the remote controller Y are respectively disposed a transfer switch for switching between a commissioning state and a use state, as well as a travel confirmation button and a matching button, where the travel confirmation button comprises an up travel confirmation button and a down travel confirmation button.

The control method of the embodiment 3 may comprise the following steps.

At step A1, according to the needs, the curtain assembly is mounted, and then a corresponding remote controller is selected according to the mounted curtain assembly. If the mounted curtain assembly is the left-right type curtain assembly, the remote controller X is selected and then matched with the controller 9, and then, proceed to the next step; if the mounted curtain assembly is the up-down type curtain assembly, the remote controller Y is selected and then matched with the controller Y, and then skip to A3.

At step A2, if the remote controller X is successfully matched with the controller, the controller automatically switches to the control method corresponding to the remote controller X; the control method of controlling the left-right type curtain assembly is a separate control which is equivalent in principle to that two simple honeycomb curtains are combined together but controlled separately without interaction between them.

At step A3, if the remote controller Y is successfully matched with the controller, the controller automatically switches to the control method corresponding to the remote controller Y; the control method for controlling the up-down type curtain assembly is a combination control which requires feedback, and the control method is already used in the existing day-night curtains and thus will not be repeated herein.

The matching method in the step A1 comprises the following steps.

At step A11, the first button module or the second button module is long-pressed and at this time, the controller will enter a code matching state.

At step A12, the transfer switch on the remote controller X or the remote controller Y is switched to the commissioning state and then the matching button at the back side of the remote controller is long-pressed.

At step A13, within a set time, if the curtain assembly acts successfully based on the preset matching code, it is determined that the code matching is successful at this time; if the curtain assembly does not act successfully based on the preset matching code, it is determined that the code matching is unsuccessful at this time.

The control method of controlling the left-right type curtain assembly in the A2 may comprise the following steps.

At step B1, the up button in the first group of buttons is pressed, where one drive mechanism drives the corresponding the curtain assembly to run upward; the down button in the first group of buttons is pressed, where one drive mechanism drives the corresponding curtain assembly to run downward; the stop button in the first group of buttons is pressed, where one drive mechanism is stopped and thus the corresponding curtain assembly is stopped.

At step B2, the up button in the second group of buttons is pressed, where the other drive mechanism drives the corresponding curtain assembly to run upward; the down button in the second group of buttons is pressed, where the other drive mechanism drives the corresponding curtain assembly to run downward; the stop button in the second group of buttons is pressed, where the other drive mechanism is stopped and thus the corresponding curtain assembly is stopped.

The control method of controlling the up-down type curtain assembly in A3 comprises the following steps.

At step C1, if the up button or the down button in the first group of buttons or the second group of buttons is pressed separately, the first lower beam runs upward or downward, or the second lower beam runs upward or downward, and at this time, the first lower beam and the second lower beam run separately;

At step C2, if the stop button in one group is pressed, the corresponding drive mechanism is stopped and the corresponding first lower beam or second lower beam is stopped.

In the running mode, the controller can obtain, in real time, travel data of the first motor in the first drive mechanism and the second motor in the second drive mechanism, and then calculate a real-time position of the first lower beam and the second lower beam, and compare the real-time position with a preset upper limit position of the first lower beam, a preset lower limit position of the second lower beam, and a preset safe distance between the first lower beam and the second lower beam, and stop the corresponding drive mechanism upon reaching.

The method of setting the up and down travels comprises the following steps.

At step D1, the transfer switch on the back side of the remote controller is switched to the commissioning state.

At step D2, the operation button on the front side of the remote controller is operated to enable the curtain assembly to run to a preset up travel position and the up travel confirmation button on the back side of the remote controller is long-pressed to confirm the up travel position.

At step D3, the operation button on the front side of the remote controller is operated to enable the curtain assembly to run to a preset down travel position and the down travel confirmation button on the back side of the remote controller is long-pressed to confirm the down travel position.

Embodiment 4

Figure 12:
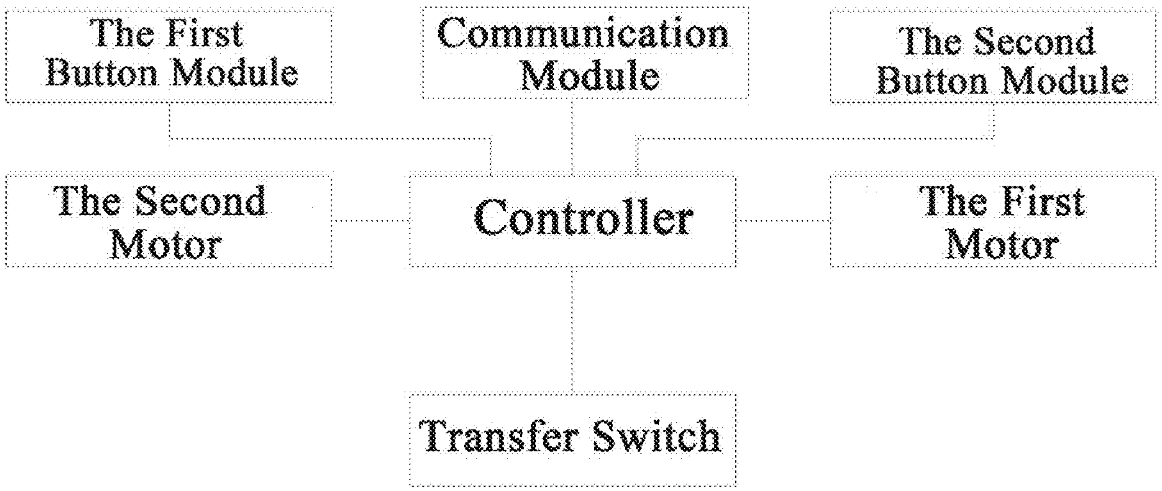
FIG. 12 is a connection block diagram of a circuit in a double-layer day-night curtain system according to an embodiment 4 of the present disclosure.

As shown in FIG. 12, the present embodiment differs from the embodiment 3 as follows: the embodiment 4 further comprises a change-over switch with two levels, which is connected to the controller 9. In this case, the change of the control method is not determined by the matching of the remote controller, but by the manual adjustment of the change-over switch. When the change-over switch is at level 1, the control method is applicable to the left-right type curtain assembly 4; when the change-over switch is at level 2, the control method is applicable to the up-down type curtain assembly 4. In other words, after mounting the curtain assembly 4, the user needs to firstly adjust the change-over switch based on the mounted curtain assembly 4. When the left-right type curtain assembly 4 is mounted, it is required to adjust the change-over switch to level 1, and then the remote controller X is matched with the controller 9; when the up-down type curtain assembly 4 is mounted, it is required to adjust the change-over switch to level 2, and then the remote controller Y is matched with the controller 9.

Embodiment 5

Figure 13:
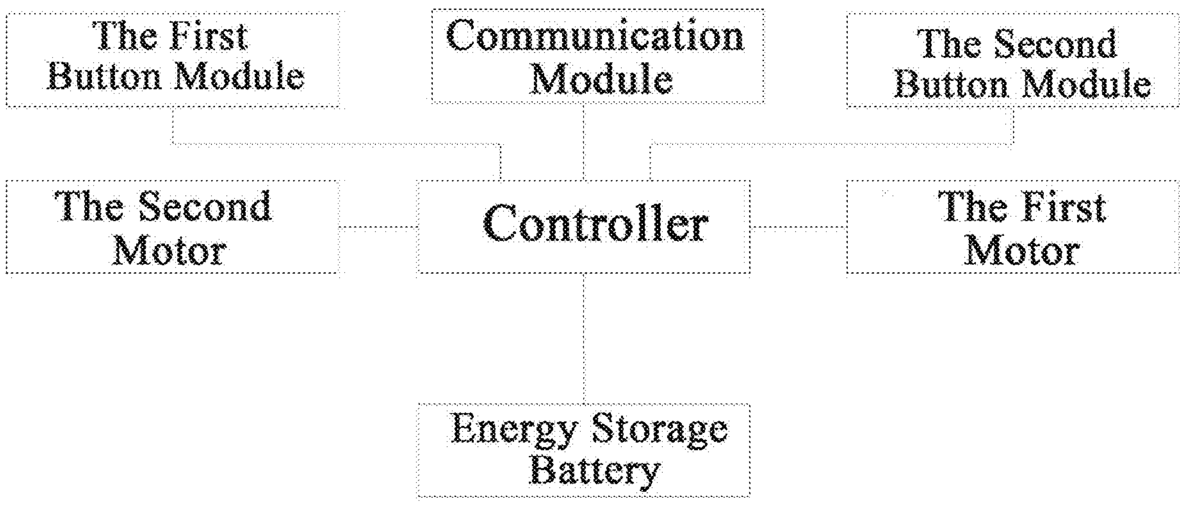
FIG. 13 is a connection block diagram of a circuit in a double-layer day-night curtain system according to an embodiment 5 of the present disclosure.

As shown in FIG. 13, the present embodiment differs from the embodiment 1 as follows: the embodiment 5 further comprises an energy storage battery, which is a lithium battery. The energy storage battery is disposed in one mounting cavity 14 and electrically connected with the controller 9 for power supply. In normal use, the energy storage battery is in full state. When power outage occurs, the energy storage battery provides electric energy to the controller 9 and thus the drive mechanism 3 can be still controlled to work during power outage.

Embodiment 6

Figure 14:
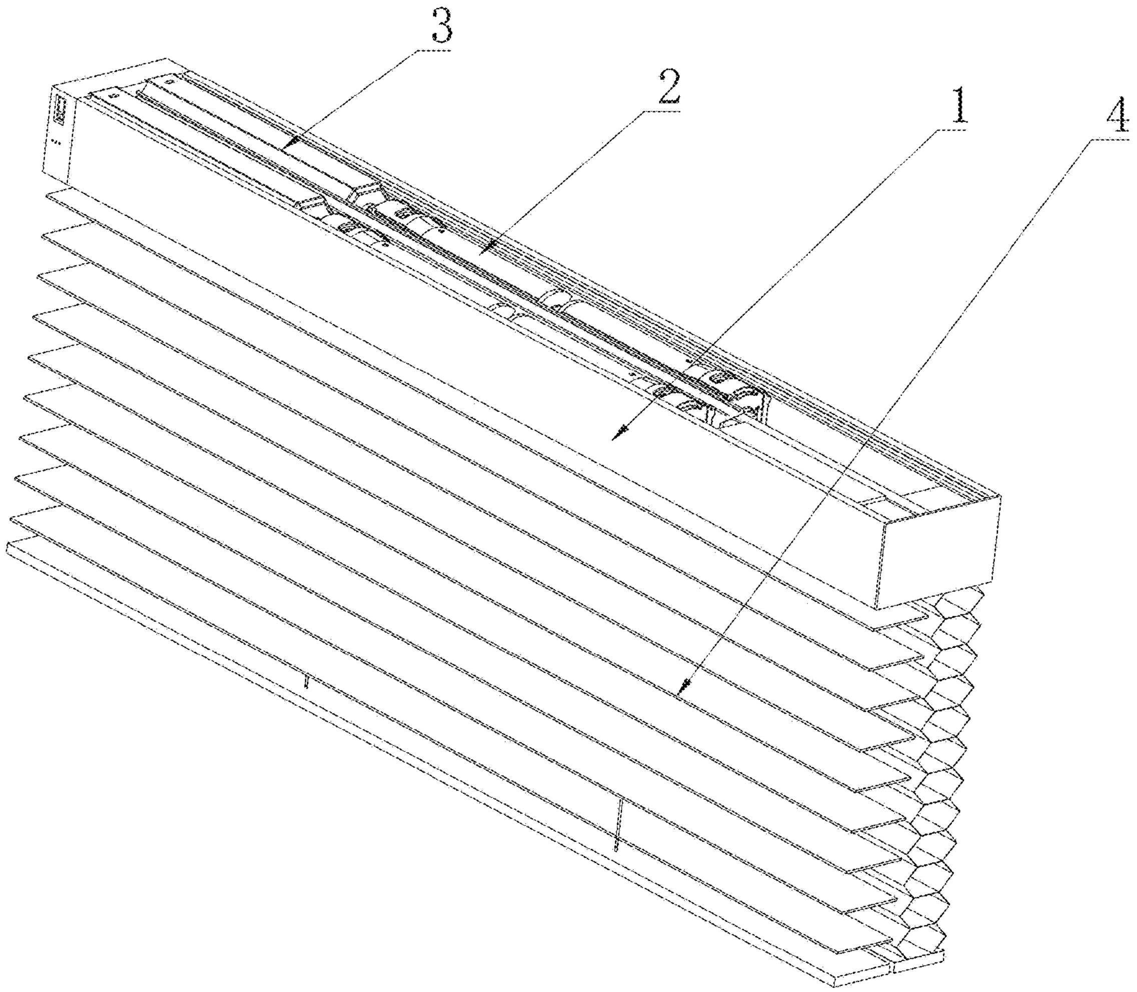
FIG. 14 is a structural schematic diagram of a double-layer day-night curtain system according to an embodiment 6 of the present disclosure.

As shown in FIG. 14, the present embodiment differs from the embodiment 1 as follows: in the embodiment 5, the curtain bodies 10 are not two honeycomb curtains but one honeycomb curtain and one venetian blind. Since they are two separate curtain systems, various combinations of curtain types may be evolved for use. Therefore, they are not limited to the combination of two honeycomb curtains of the embodiment 1 nor limited to the combination of venetian blind and honeycomb curtain in the embodiment 6.

Although the embodiments of the present disclosure have been illustrated and described, it can be understood that the above embodiments are only illustrative and shall not be interpreted as limiting of the present disclosure. Persons of ordinary skill in the prior arts can make changes, modifications, substitutions or variations to the above embodiments within the scope of the present disclosure.

Various changes and modifications will become apparent to those skilled in the art after reading the above specification. Hence, the appended claims shall be considered as covering all changes and modifications within the true intention and scope of the present disclosure. Any or all equivalent scopes or contents in the scope of the appended claims shall be considered as within the intention and scope of the present disclosure.

The invention claimed is:

1. A double-layer day-night curtain system, comprising: an upper rail, a transmission device disposed inside the upper rail, two curtain assemblies connected to the transmission device, and a drive mechanism connected to the upper rail to drive the transmission device; the two curtain assemblies are disposed in parallel; the transmission device having two transmission mechanisms disposed inside the upper rail; each of the two transmission mechanisms comprises a wire reel and a drive shaft, the wire reel is sleeved on the drive shaft, and two curtain assemblies are respectively disposed under the two transmission mechanisms; the drive mechanism comprises a first motor, a first speed reducer, a second speed reducer, a second motor and a controller; the first motor and the second motor are both electrically connected to the controller; the first motor is connected to one transmission mechanism through the first speed reducer and the second motor is connected to the other transmission mechanism through the second speed reducer.

2. The double-layer day-night curtain system of claim 1, wherein each transmission mechanism comprises at least two wire reels and one drive shaft, and the two wire reels are both sleeved on the one drive shaft; an output shaft at a side of the first motor is connected to the drive shaft of one transmission mechanism through the first speed reducer, and an output shaft at a side of the second motor is connected to the drive shaft of the other transmission mechanism through the second speed reducer.

3. The double-layer day-night curtain system of claim 1, wherein each transmission mechanism comprises at least two wire reels and two drive shafts, the two wire reels are sleeved on the two drive shafts respectively; two first speed reducers and two second speed reducers are provided; the output shaft at one side of the first motor is connected to one drive shaft of one transmission mechanism through one first speed reducer, and the output shaft at the other side of the first motor is connected to another drive shaft of one transmission mechanism through the other first speed reducer; the output shaft at one side of the second motor is connected to one drive shaft of the other transmission mechanism through one second speed reducer, and the output shaft at the other side of the second motor is connected to the other drive shaft of the other transmission mechanism through the other second speed reducer.

4. The double-layer day-night curtain system of claim 1, wherein the curtain assembly comprises a curtain body, a pull rope and a lower beam; the lower beam is disposed under the transmission mechanism and connected to the wire reel through the pull rope; the curtain body is disposed between the upper rail and the lower beam and the pull rope penetrates through the curtain body.

5. The double-layer day-night curtain system of claim 1, wherein a mounting cavity is disposed inside the upper rail, and a baffle plate is disposed at a side of the mounting cavity; the drive mechanism is disposed at the other side of the mounting cavity; the two transmission mechanisms are both disposed inside the mounting cavity, and the transmission mechanisms further comprise support seats for supporting the wire reels; a partition plate is disposed in the middle of the mounting cavity to separate the mounting cavity equally into two mounting cavities, and the two transmission mechanisms are respectively disposed in the two mounting cavities.

6. The double-layer day-night curtain system of claim 5, wherein the drive mechanism further comprises a mounting housing; the first motor, the first speed reducer, the second speed reducer, the second motor and the controller are all disposed inside the mounting housing and arranged to form a U-shape; parts of mounting housings for accommodating the first motor and the second motor respectively protrude into the two mounting cavities; a Hall signal plate is disposed at an end of the first motor and the second motor respectively, and the Hall signal plate is disposed in parallel to a main control board in the controller.

7. The double-layer day-night curtain system of claim 6, wherein it further comprises a remote controller X1, a remote controller X2, a first button module, a second button module and a communication module; the first button module, the second button module and the communication module are all electrically connected to the controller; the remote controller X1 and the remote controller X2 are respectively disposed at two sides of the mounting housing, and the remote controller X1 and the remote controller X2 are in communication connection with the controller through the communication module; the first button module is pressed to match the remote controller X1 with the controller and the remote controller X1 controls one drive mechanism, and the second button module is pressed to match the remote controller X2 with the controller, and the remote controller X2 controls the other drive mechanism.

8. The double-layer day-night curtain system of claim 5, wherein two mounting grooves for mounting two curtain assemblies are disposed at a lower end surface of the upper rail, and the curtain assemblies are detachably mounted into the mounting grooves.

9. The double-layer day-night curtain system of claim 8, wherein the curtain assemblies are mounted into the mounting grooves by insertion; one end of the curtain assembly is abutted against the baffle plate and the other end of the curtain assembly is abutted against the mounting housing when the curtain assemblies are mounted into the mounting grooves.

10. A control method of a double-layer day-night curtain system of claim 8, wherein it further comprises two remote controllers, respectively a remote controller X and a remote controller Y; the remote controller X is used to control the left-right type curtain assembly and the remote controller Y is used to control the up-down type curtain assembly; the control method comprises the following steps:

step A1, install the curtain assembly as required, select a corresponding remote controller according to the mounted curtain assembly; select remote controller X for left-right type curtain assembly, and then match controller X with the controller, and proceed to the next step; select remote controller Y for up-down type curtain assembly, and then match controller Y with the controller, and then skip to step A3;

step A2, when the remote controller X is successfully matched with the controller, the controller automatically switches to the control method for controlling the left-right type curtain assembly;

step A3, when the remote controller Y is successfully matched with the controller, the controller automatically switches to the control method for controlling the up-down type curtain assembly.

11. The control method of a double-layer day-night curtain system of claim 10, wherein two groups of buttons are disposed on the remote controller X, respectively a first group of buttons and a second group of buttons; each group of buttons respectively comprises an up button, a stop button and a down button; the control method of controlling the left-right type curtain assembly in the step A2 comprises the following steps:

step B1, the up button in the first group of buttons is pressed, and one drive mechanism drives the corresponding curtain assembly to run upward; the down button in the first group of buttons is pressed, and one drive mechanism drives the corresponding curtain assembly to run downward; the stop button in the first group of buttons is pressed, and one drive mechanism is stopped and thus the corresponding curtain assembly is stopped;

step B2, the up button in the second group of buttons is pressed, and the other drive mechanism drives the corresponding curtain assembly to run upward; the down button in the second group of buttons is pressed, and the other drive mechanism drives the corresponding curtain assembly to run downward; the stop button in the second group of buttons is pressed, and the other drive mechanism is stopped and thus the corresponding curtain assembly is stopped.

12. The control method of a double-layer day-night curtain system of claim 10, wherein two groups of buttons are disposed on the remote controller Y, which are a first group of buttons and a second group of buttons; each group of buttons respectively comprise an up button, a stop button and a down button, and the two drive mechanisms are a first drive mechanism and a second drive mechanism respectively; the up-down type curtain assembly comprises sequentially from top to bottom: an upper rail, a first curtain body, a first lower beam, a second curtain body, and a second lower beam; the first drive mechanism controls the first lower beam, and the first group of buttons controls the first drive mechanism; the second drive mechanism controls the second lower beam and the second group of buttons controls the second drive mechanism; the control method of controlling the up-down type curtain assembly in step A3 comprises the following steps:

step C1, when the up button or the down button in the first group of buttons or the second group of buttons is pressed separately, the first lower beam runs upward or downward, or the second lower beam runs upward or downward, and at this time, the first lower beam and the second lower beam run separately;

step C2, when the stop button in one group is pressed, the corresponding drive mechanism is stopped and the corresponding first lower beam or second lower beam is stopped; in the running mode, the controller obtains travel data of the first motor in the first drive mechanism and the second motor in the second drive mechanism in real time, and then calculate a real-time position of the first lower beam and the second lower beam, and compare the real-time position with a preset upper limit position of the first lower beam, a preset lower limit position of the second lower beam, and a preset safe distance between the first lower beam and the second lower beam, and stop the corresponding drive mechanism upon reaching.

* * * * *